United States Patent
So

(10) Patent No.: US 10,631,522 B2
(45) Date of Patent: Apr. 28, 2020

(54) BALL TRAINER WITH LAUNCHER FUNCTION AND DROPPER FUNCTION AND TRAINING BOX

(71) Applicant: Dogtra co., Ltd., Incheon (KR)

(72) Inventor: Min Kyun So, Seoul (KR)

(73) Assignee: Dogtra co., Ltd., Incheon (KR)

( * ) Notice: Subject to any disclaimer, the term of this patent is extended or adjusted under 35 U.S.C. 154(b) by 309 days.

(21) Appl. No.: 15/857,044

(22) Filed: Dec. 28, 2017

(65) Prior Publication Data

US 2019/0059327 A1    Feb. 28, 2019

(30) Foreign Application Priority Data

Aug. 25, 2017  (KR) .................. 10-2017-0107763
Nov. 6, 2017   (KR) .................. 10-2017-0146616

(51) Int. Cl.
*A63B 69/40*    (2006.01)
*A01K 15/02*    (2006.01)

(52) U.S. Cl.
CPC .......... *A01K 15/025* (2013.01); *A63B 69/407* (2013.01)

(58) Field of Classification Search
CPC ..... A63B 69/40; A63B 69/406; A63B 69/407; A63B 69/408; A63B 69/409; A63B 2208/14; A01K 15/02; A01K 15/025; A01K 15/027
USPC ............... 124/6, 16, 51.1; 119/707
See application file for complete search history.

(56) References Cited

U.S. PATENT DOCUMENTS

| | | | | |
|---|---|---|---|---|
| 3,724,438 A | * | 4/1973 | Brandt | F41J 9/26 124/59 |
| 3,911,888 A | * | 10/1975 | Horvath | A63B 69/409 124/56 |
| 4,267,799 A | * | 5/1981 | Bacon | A01K 5/0275 119/61.2 |
| 4,345,578 A | * | 8/1982 | Speer | A63B 69/40 124/56 |
| 4,559,918 A | * | 12/1985 | Ballerin | A63B 69/406 124/78 |
| 4,721,091 A | * | 1/1988 | Ridley | A63B 69/408 124/16 |

(Continued)

FOREIGN PATENT DOCUMENTS

| | | |
|---|---|---|
| JP | 3433515 | 8/2003 |
| KR | 10-0778920 | 11/2007 |
| KR | 1020130027393 | 3/2013 |

OTHER PUBLICATIONS

Office Action issued by the Korean Intellectual Property Office dated Jun. 12, 2019.

*Primary Examiner* — Alexander R Niconovich
(74) *Attorney, Agent, or Firm* — IP & T Group LLP

(57) ABSTRACT

A ball trainer with a launcher function and a dropper function is provided. The ball trainer includes: a dropper unit that is disposed on one side in a housing and is formed in a holder shape capable of dropping a ball downward, the dropper unit including a storage space with a variable length in which two or more balls are stored; a launcher unit that is disposed on the other side in the housing and launches a ball which is received from outside; a control module that selectively controls the dropper unit and the launcher unit depending on an operation mode; and a communication module that is connected to the control module and transmits a signal received from the outside in a wireless or wired manner.

13 Claims, 13 Drawing Sheets

(56) References Cited

U.S. PATENT DOCUMENTS

| | | | | |
|---|---|---|---|---|
| 4,995,374 A * | 2/1991 | Black | A01K 15/025 | 124/32 |
| 5,160,131 A * | 11/1992 | Leon | A63B 69/409 | 124/56 |
| 5,417,196 A * | 5/1995 | Morrison | A63B 69/40 | 124/6 |
| 5,597,160 A * | 1/1997 | Mims | A63B 69/407 | 124/16 |
| 5,722,384 A * | 3/1998 | Cox | A63B 69/40 | 124/78 |
| 5,733,209 A * | 3/1998 | McIntyre, IV | A63B 69/409 | 473/133 |
| 6,176,230 B1 * | 1/2001 | Thompson | A63B 69/407 | 124/16 |
| 6,305,366 B1 * | 10/2001 | Rizzo | A63B 69/406 | 124/6 |
| 6,402,640 B1 * | 6/2002 | Stuart | A63B 69/406 | 124/6 |
| 6,416,429 B1 * | 7/2002 | Pecoraro | A63B 69/0002 | 124/6 |
| 6,443,859 B1 * | 9/2002 | Markin | A63B 69/406 | 124/6 |
| 6,684,872 B2 * | 2/2004 | Kao | A63B 47/002 | 124/56 |
| 6,772,745 B2 * | 8/2004 | McEachen | A63B 69/406 | 124/51.1 |
| 6,875,136 B2 * | 4/2005 | Leal | A63B 69/0002 | 124/16 |
| 7,001,289 B1 * | 2/2006 | Polega | A63B 47/002 | 473/459 |
| 7,244,198 B2 * | 7/2007 | Morshed | A63B 47/002 | 473/459 |
| 7,278,934 B2 * | 10/2007 | McBride | A63B 63/00 | 124/78 |
| 7,350,515 B2 * | 4/2008 | Yao | A63B 47/002 | 124/49 |
| 7,500,927 B2 * | 3/2009 | Morshed | A63B 47/002 | 473/459 |
| 7,549,415 B2 * | 6/2009 | Karellas | A63B 69/002 | 124/16 |
| 7,861,699 B2 * | 1/2011 | Gowan | A63B 69/407 | 124/16 |
| 7,958,880 B1 * | 6/2011 | Mashburn | A63B 69/0002 | 124/65 |
| 8,104,458 B2 * | 1/2012 | Hoffman | A63B 69/40 | 124/3 |
| 8,663,035 B2 * | 3/2014 | Burgess | A63B 69/40 | 473/451 |
| 9,259,631 B2 * | 2/2016 | Gowan | A63B 69/408 | |
| 9,301,503 B1 * | 4/2016 | Arrighi | A01K 15/025 | |
| 9,320,960 B1 * | 4/2016 | Ward | F41B 7/00 | |
| 9,345,946 B2 * | 5/2016 | Hamill | A01K 15/025 | |
| 10,028,488 B2 * | 7/2018 | Hsu | A01K 15/027 | |
| 10,052,544 B2 * | 8/2018 | Gowan | A63B 71/0619 | |
| 10,117,419 B2 * | 11/2018 | Hamill | A01K 15/027 | |
| 10,245,489 B2 * | 4/2019 | Kim | A63B 69/407 | |

\* cited by examiner

BALL TRAINER WITH LAUNCHER FUNCTION AND DROPPER FUNCTION AND TRAINING BOX

CROSS-REFERENCE TO RELATED APPLICATIONS

The present application claims priority of Korean Patent Application Nos. 10-2017-0107763 and 10-2017-0146616, filed on Aug. 25, 2017 and Nov. 6, 2017, respectively, which are herein incorporated by reference in their entirety.

BACKGROUND

Field of the Invention

The invention relates to a ball trainer that is used to train an animal, and more particularly, to a ball trainer with a launcher function and a dropper function and a training box that can complexly carry out a dropper function and a launcher function of a ball for training an animal.

Description of the Related Art

Unlike the past big family system, family members have decreased and single persons have increased due to an increase in nuclear family, an increase in divorce, an increase in marriage age, an increase in unmarried persons, and the like. Therefore, the number of persons who live along with animal companions for resolution of loneliness has increased gradually. Animal companions are beyond a role as animals living with persons and are recognized as companions of family or life. Accordingly, persons who raise animal companions use various methods for basic communication for cohabitation and basic training.

A ball is often used to train a dog which is a representative animal companion. For example, a ball is used for obedience training of throwing the ball and then retrieving the ball. In this case, various ball launchers and ball droppers are used as instruments that automatically supply balls.

The ball launcher is an instrument that can provide the same effect as throwing a ball to a specific height. The ball dropper is an instrument that can cause a dog to react with a ball which is dropped by a person.

As an example of the ball launcher, a ball game instrument for pets is disclosed in Korean Unexamined Patent Publication No 10-2013-0027393. The ball game instrument is for automatically launching a ball to allow a pet to play and exercise alone. In the ball game instrument, when a pet retrieves a ball and places the ball in the instrument, the ball is discharged with application of a predetermined force thereto. Such an instrument can be used for a pet's play, but is not suitable for advanced training of pets. The instrument can launch a ball, but cannot be used to drop a ball from a predetermined height.

On the other hand, both a function of launching a ball and a function of dropping a ball may be required depending on training methods. However, a training instrument having both the function of launching a ball and the function of dropping a ball has not been provided yet. Accordingly, both a ball launcher and a ball dropper have to be owned to perform training using both the function of launching a ball and the function of dropping a ball. Since these training instruments are generally operated in a radio remote control manner, a user has to carry controllers for the training instruments. States of charge of batteries of power supply units for four pieces including a ball launcher, a remote controller thereof, a ball dropper, and a remote controller thereof have to be managed and thus there is a problem with maintenance.

SUMMARY

The invention provides a ball trainer with a launcher function and a dropper function and a training box that can complexly carry out a dropper function and a launcher function of a ball for training an animal.

Other objects of the invention will be easily understood from the following description.

According to an aspect of the invention, there is provided a ball trainer with a launcher function and a dropper function, including: a dropper unit that is disposed on one side in a housing and is formed in a holder shape capable of dropping a ball downward, the dropper unit including a storage space with a variable length in which two or more balls are stored; a launcher unit that is disposed on the other side in the housing and launches a ball which is received from outside; a control module that selectively controls the dropper unit and the launcher unit depending on an operation mode; and a communication module that is connected to the control module and transmits a signal received from the outside in a wireless or wired manner.

The dropper unit may include: a main holder that has a pipe shape which is vertically open; and an extension holder that has an inner diameter larger than an outer diameter of the main holder and overlaps to surround an outer circumferential surface of the main holder.

The extension holder may be movable along the outer circumferential surface of the main holder, and the extension holder may protrude from the housing such that one or more balls is received in the extension holder.

The ball trainer may further include: a locking rod that is disposed to be suspended below a ball received in the main holder and moves forward or backward to drop the ball in the main holder downward; an intermediate locking rod that is disposed to be separated from the locking rod by a diameter of the ball and moves oppositely to the locking rod; and a drive unit that activates the locking rod and the intermediate locking rod in response to the signal.

The drive unit may include: a motor; and a rotary support that rotates by the motor and has the locking rod and the intermediate locking rod connected to both ends thereof, and the locking rod and the intermediate locking rod may protrude alternately into the main holder with the rotation of the rotary support.

A state in which the locking rod moves forward and the intermediate locking rod moves backward may be set as a drop standby state, and the drop standby state may be switched to a drop state in which the locking rod moves backward and the intermediate locking rod moves forward by the drive unit.

The launcher unit may include: a launcher holder that is open upward and provides a space in which a ball is received; a receiving stand that moves along an inner side surface of the launcher holder and on which a ball to be input is received; a launcher spring that is disposed below the receiving stand and transmits an elastic force based on compression to the receiving stand between the receiving stand and the launcher holder; a support rod that is formed long below the receiving stand; and a locking portion that is formed to correspond to a locking groove formed on a side surface of the support rod and launches a ball by the elastic force of the launcher spring.

The locking portion may include: a locking body of which one side is open; a locking spring that is disposed on the other side of the locking body and biases the locking body to the support rod; a locking protrusion that is disposed to protrude from the inner side surface of the locking body; and a pressing force receiving portion that is formed at one end of the locking body, and the locking portion may be located at a height corresponding to the intermediate locking rod and may switch the pressing force receiving portion from a locked state to an unlocked state receiving a pressing force from the other end of the intermediate locking rod.

A state in which the locking rod moves backward and the intermediate locking rod moves forward may be set as a launch standby state, and the launch standby state may be switched to a launch state in which the locking rod moves forward and the intermediate locking rod moves backward by the drive unit.

The launcher spring may be a conical spring.

The ball trainer may further include a foldable support that is disposed on a bottom surface of the housing and is exposed to the outside at the time of operation of the launcher unit such that the ball trainer does not shake due to vibration of the launcher unit.

According to another aspect of the invention, there is provided a training box including: a box body that has a box shape of which one surface is open and the inside of which is empty and has the ball trainer with a launcher function and a dropper function mounted therein; and a lid that covers the open surface of the box body, wherein a cylindrical guide having an inner diameter corresponding to a diameter of the ball is formed to protrude at the center of an inner surface of the lid.

A pair of vertical supports may be diagonally separated from each other in the box body, and the ball trainer with a launcher function and a dropper function is inserted between the vertical supports and the launcher unit is disposed at the center to meet an end of the cylindrical guide.

Other aspects, features, advantages of the invention will be apparent from the accompanying drawings, the appended claims, and the following description of embodiments.

According to the aspect of the invention, a pet dog can be trained using a single device that launches and drops a ball and can be provided with a reward, whereby a training effect can be enhanced.

By embodying a space for receiving a ball for dropping to be variable, more balls can be received using a small space.

By providing an elastic force for launching a ball using a conical spring, it is possible to minimize a space for the spring and thus to decrease the size of the ball trainer.

Since the launcher unit and the dropper unit can be driven by a single drive unit, it is possible to minimize the structure for driving, to reduce a manufacturing cost, and to prevent an erroneous operation with a simple link structure.

Since the ball trainer is supported using a variable support, it is possible to reduce an influence of vibration at the time of launching a ball and to stably launch a ball.

DESCRIPTION OF EMBODIMENTS

Figure 1:
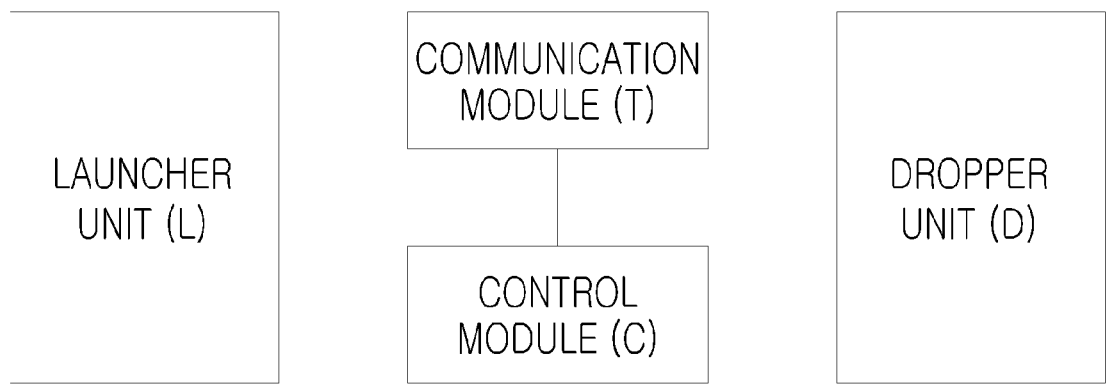
FIG. 1 is a diagram schematically illustrating a configuration of a ball trainer with a launcher function and a dropper function according to an embodiment of the invention.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms "first", "second", and the like can be used to describe various elements, but the elements should not be limited to the terms. The terms are used only to distinguish an element from another.

Terms "unit", "module", and the like described in the specification mean a unit for performing at least one function or operation and can be embodied by hardware, by software, or by a combination of hardware and software.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

FIG. 1 is a diagram schematically illustrating a configuration of a ball trainer with a launcher function and a dropper function according to an embodiment of the invention.

The ball trainer according to the embodiment of the invention is a device that can launch or drop a ball for training an animal and is characterized in that a launcher and a dropper are incorporated into one body and a size thereof is decreased for simpler portability. That is, a launcher and a dropper are incorporated into a single housing and components capable of minimizing an internal space are introduced for a simpler structure. Particularly, a ball launching function and a ball dropping function can be performed using a single drive unit to minimize the components.

The ball trainer according to the embodiment mainly includes a dropper unit D, a launcher unit L, a control module C, and a communication module T.

The dropper unit D is a unit that receives a ball therein and freely drops the ball downward in response to a signal. This unit corresponds to a structure that can drop a ball for an animal in a state in which a user carries the ball trainer or places the ball train at a relatively high position.

The launcher unit L is a unit that receives a ball therein and then launches the ball upward with various forces. This unit corresponds to a structure that can fix the ball trainer on the ground and launch the ball for an animal upward.

The control module C controls operations of the dropper unit D and the launcher unit L such that the units operate selectively and controls operations of launching and dropping a ball.

The communication module T is electrically connected to the control module C and serves to receive an external signal in a wireless manner and to transmit the received external signal to the control module C. Particularly, the communication module T is configured to receive a signal from a remote controller which is carried by a user and to activate the dropper unit D and the launcher unit L.

Figure 2:
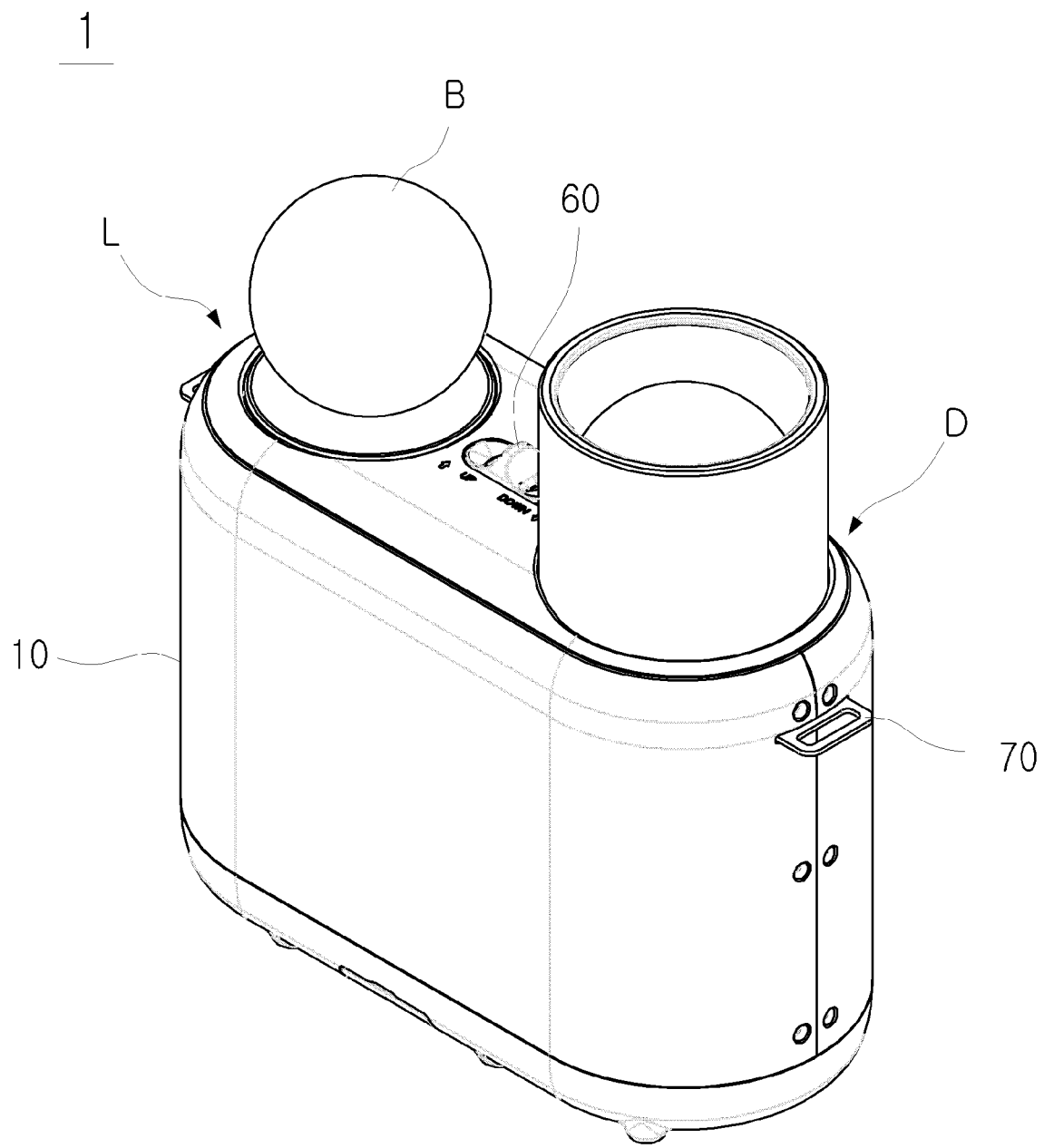
FIG. 2 is a perspective view of the ball trainer with a launcher function and a dropper function according to the embodiment of the invention.
Figure 3:
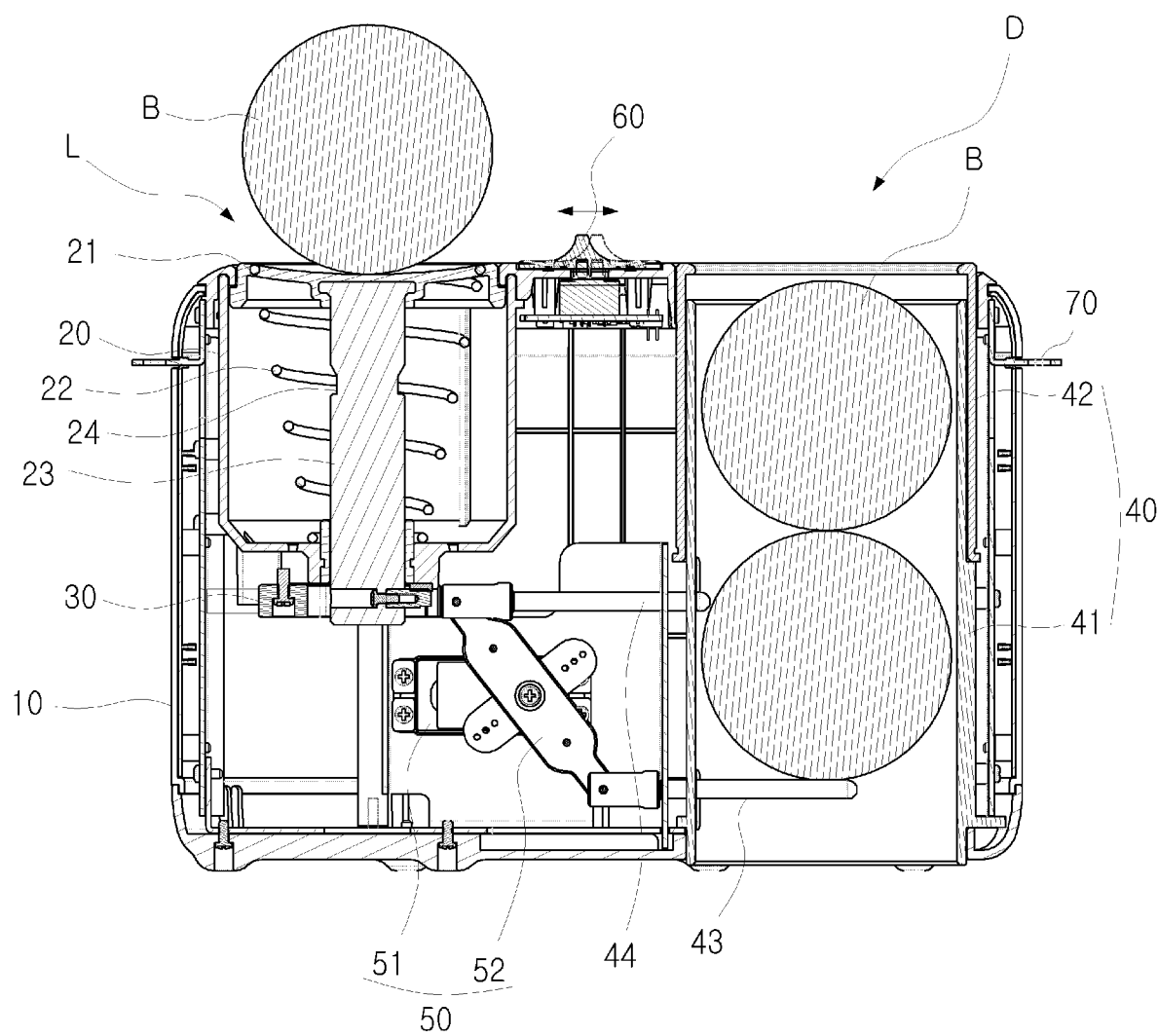
FIG. 3 is a sectional view of the ball trainer with a launcher function and a dropper function according to the embodiment of the invention.
Figure 4:
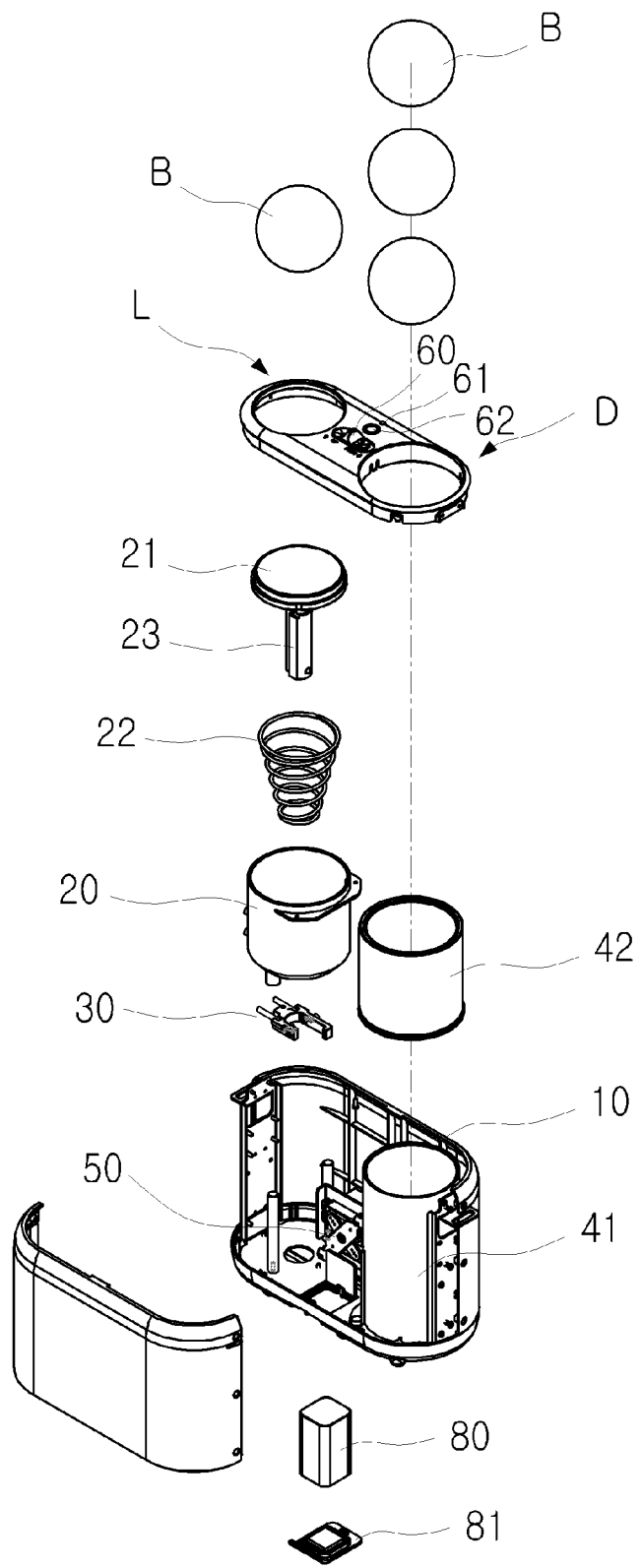
FIG. 4 is an exploded perspective view of the ball trainer with a launcher function and a dropper function according to an embodiment of the invention.
Figure 10:
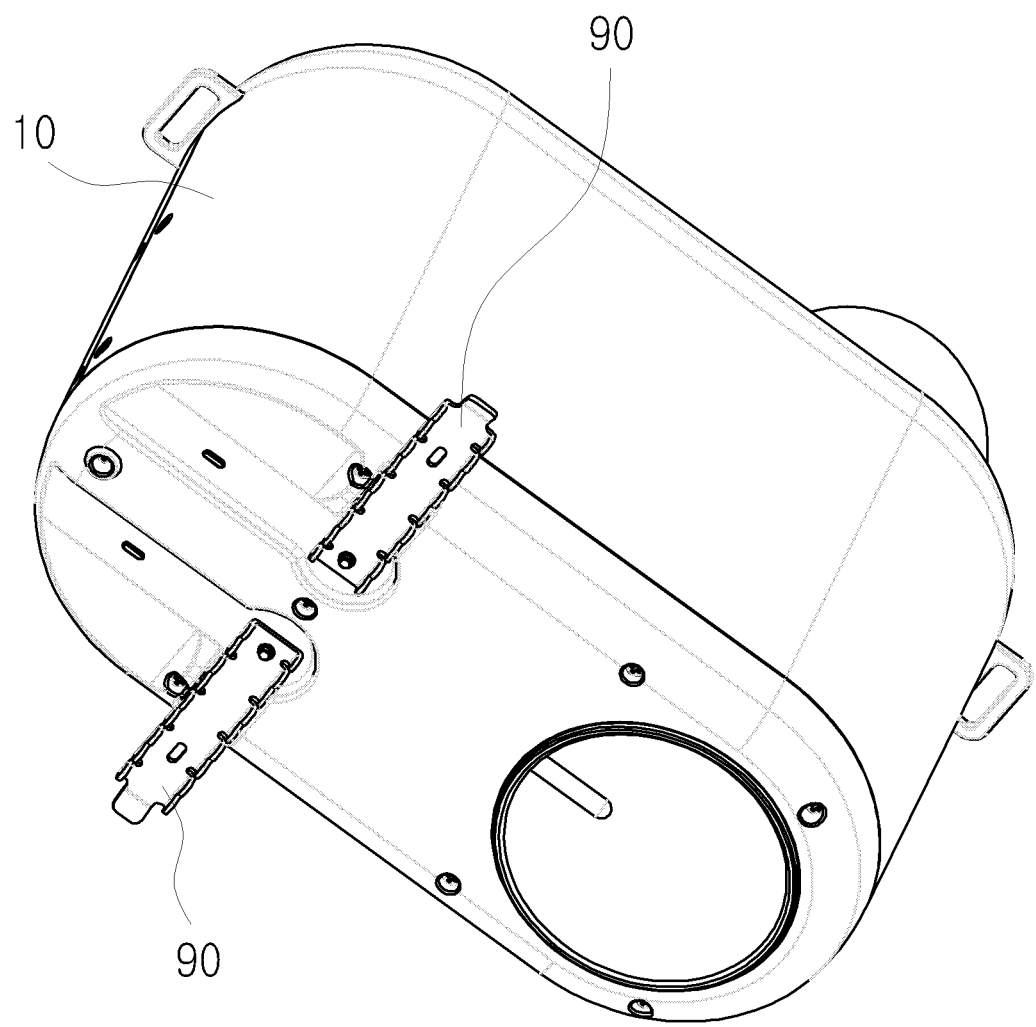
FIG. 10 is a diagram illustrating an operating state of a support of the ball trainer with a launcher function and a dropper function according to the embodiment of the invention.

FIG. 2 is a perspective view of the ball trainer with a launcher function and a dropper function according to the embodiment of the invention. FIG. 3 is a sectional view of the ball trainer with a launcher function and a dropper function according to the embodiment of the invention. FIG. 4 is an exploded perspective view of the ball trainer with a launcher function and a dropper function according to an embodiment of the invention. FIG. 10 is a diagram illustrating an operating state of a support of the ball trainer with a launcher function and a dropper function according to the embodiment of the invention.

A configuration of the ball trainer with a launcher function and a dropper function according to the embodiment of the invention will be described below in detail with reference to FIGS. 2 to 4.

The ball trainer 1 with a launcher function and a dropper function according to the embodiment of the invention includes the dropper unit D and the launcher unit L which are incorporated into a single housing 10.

The housing 10 may have various shapes as long as a space for the communication module T and the control module C is formed therein and the dropper unit D and the launcher unit L are arranged in parallel. The housing 10 has, for example, a cylindrical shape in which an unnecessary space can be excluded to minimize the space.

The dropper unit D is disposed on one side in the housing 10. The dropper unit D includes a dropper holder 40 having a pipe shape such that a ball (a training ball) therein can be dropped downward. The dropper holder 40 has a shape of which a top and a bottom are open, and when a ball is input from the upside, the bottom can be opened by a predetermined operation to drop the input ball downward.

When the size of the ball trainer 1 decreases, the number of balls located in the holder is limited. When the number of balls located therein increases, the size of the dropper holder 40 increases, the whole size of the housing 10 increases, and the whole size of the ball trainer 1 increases, which causes inconvenience in carrying the ball trainer. Accordingly, in this embodiment, the dropper holder 40 is divided into a main holder 41 and an extension holder 42 and is configured such that main holder 41 and the extension holder 42 overlap in a telescopic manner.

Basically, the main holder 41 is provided as a passage in which a ball B can move. The extension holder 42 with an inner diameter larger than an outer diameter of the main holder 41 is attached to be movable upward and downward along the outer circumferential surface of the main holder 41.

When the dropper unit D does not operate, the extension holder 42 is located inside the housing 10. When the dropper unit D operates, the extension holder 42 is caused to protrude from the housing 10 to increase the number of balls which can be input into the dropper unit D at a time.

As illustrated in FIG. 2, when the extension holder 42 protrudes outward, three balls B can be received therein. A locking rod 43 is formed to protrude from one side surface of a lower part of the main holder 41 such that the ball B is not dropped downward. The locking rod 43 is formed to lock a lowermost ball in the main holder and to prevent the ball from being dropped downward.

An intermediate locking rod 44 can be formed in the dropper unit D to be separated by the size of the ball B from the locking rod. The locking rod 43 and the intermediate locking rod 44 are activated by a drive unit 50. The drive unit 50 includes a motor 51 and a rotary support 52. The locking rod 43 and the intermediate locking rod 44 can be connected to both ends of the rotary support 52 which is rotatable to protrude alternately. When the rotary support 52 rotates counterclockwise with the rotation of the rotary support 52, the locking rod 43 move forward to the main holder 41 to protrude, and the intermediate locking rod 44 moves backward. When the rotary support 52 rotates clockwise, the locking rod 43 moves backward from the main holder 41 and the intermediate locking rod 44 moves forward to the main holder 41 to protrude. With this configuration, when the ball B is dropped, a next ball located therein is not dropped downward along with the lowermost ball.

The rotary support 52 is driven by the motor 51, and the motor 51 is controlled by the control module C.

The launcher unit L is disposed adjacent to the dropper unit D, and is a unit in which a ball B from the outside and then launches the ball upward.

The launcher unit L includes a launcher holder 20 of which a top surface is open to launch a ball B. A receiving stand 21 on which a ball B is received is disposed to be movable along an inner side surface of the launcher holder 20. A launcher spring 22 that pushes up a ball by an elastic force between the launcher holder 20 and the receiving stand 21 is disposed below the receiving stand 21, and a support rod 23 is formed to extend downward at the center of the receiving stand 21.

The launcher holder 20 can have a diameter for allowing a ball to be located therein, and the launder holder 20 can have a height for enabling a ball B to be pushed up by the elastic force of the launcher spring 22. For example, as illustrated in the drawing, the height of the launcher holder 20 is about half a height of the housing 10.

The launcher unit L can be activated with a configuration that can hold an elastic force resulting from compression of the launcher spring 22 and instantaneously release the elastic force. For this purpose, in this embodiment, the support rod 23 is connected to the bottom surface of the receiving stand 21 and a locking groove 24 is formed on the side surface of the support rod 23. A locking portion 30 is formed at a position corresponding to the locking groove 24.

The locking portion 30 is formed to be switchable between a locked state and an unlocked state by the drive unit 50. In this embodiment, the locking portion 30 can be switched from the locked state to the unlocked state by the drive unit 50.

A minimum value of the height of the launcher holder 20 of the launcher unit L can vary depending on the type of the launcher spring 22. In order to acquire an elastic force required for launching, it is necessary to increase the length of the launcher spring 22. In this case, the height of the launcher holder 20 also increases. In this embodiment, a conical spring can be used to reduce a space for the launcher spring 22. The conical spring provides a spatial advantage at the time of compression and it is thus possible to decrease the size of the launcher unit L.

A slide switch 60 that determines an operation mode of the ball trainer 1 is installed on the top surface of the housing 10. The slide switch 60 operates in a slide manner to enhance selective intuition at the time of receiving a selection input from a user. When the slide switch 60 is located at a first position P1, the ball trainer 1 serves as the launcher unit L. When the slide switch 60 is located at a second position P2, the ball trainer 1 serves as the dropper unit D. In this case, the drive unit 50 which is shared by the launcher unit L and the dropper unit D can be set to different basic states. A toggle switch or a touch switch may be used instead of the slide switch in some embodiments.

A button 62 for supplying power to the ball trainer 1 and activating the communication module T for pairing with a mote controller can be disposed on the top surface of the housing 10. By pushing the button 62, supply of power, pairing, stop of the supply of power, and the like can be performed.

A state indication unit (not illustrated) that is connected to the control module C and indicates a current operating state can be formed on the top surface 10. The state indication unit includes an LED indication lamp and can indicate whether supply of power is turned on/off and which of the dropper unit D and the launcher unit L is selected.

Strap couplings 70 to which a strap for easy carrying by a user can be connected are formed in upper parts of the side surfaces of the housing 10. The strap couplings 70 can have various shapes and can have, for example, a rectangular ring shape corresponding to the size of the strap.

A battery 80 for supply of power can be disposed in the housing 10, and a battery cover 81 for attachment and detachment of the battery 80 can be formed on the bottom surface of the housing 10.

Foldable supports (see "90" in FIG. 10) that can stably support the ball trainer 1 in spite of vibration generated when the launcher unit L operates may be further provided on the bottom surface of the housing 10.

When the housing 10 is formed with a small width to decrease the size of the ball trainer with a launcher function and a dropper function, the ball trainer with a launcher function and a dropper function may fall down due to vibration at the time of operation of the launcher unit L. Accordingly, the foldable supports 90 can be formed to enhance stability of the ball trainer with a launcher function and a dropper function while keeping the housing 10 in a narrow shape.

The foldable supports 90 are configured to be stored on the bottom surface of the housing 10 in a normal state and to rotate to be exposed to the outside at the time of operation of the launcher unit L. Unevenness is formed on the bottom surfaces of the supports such that the supports can be effectively fixed in a place in which a ground surface is not even.

A tilt support (not illustrated) that supports the ball trainer 1 at a predetermined tilt angle can be further provided on the front surface or the rear surface of the housing 10. The tilt support is formed to be stored on a front surface or a rear surface of the housing 10 in a normal state, and is configured to rotate about a hinge to be exposed to the outside at the time of operation of the launcher unit L.

When the tilt support is unfolded, the ball trainer 1 is supported at a predetermined tilt angle. A ball can be obliquely launched at the time of operation of the launcher L, thereby providing an animal with various training details.

According to this embodiment, the launcher unit L and the dropper unit D can be received in the single housing 10 to decrease a size, various training methods can be used to train an animal using the ball trainer with a launcher function and a dropper function, and portability and convenience can be improved.

An operation of the ball trainer with a launcher function and a dropper function according to the embodiment of the invention will be described below.

Figure 5:
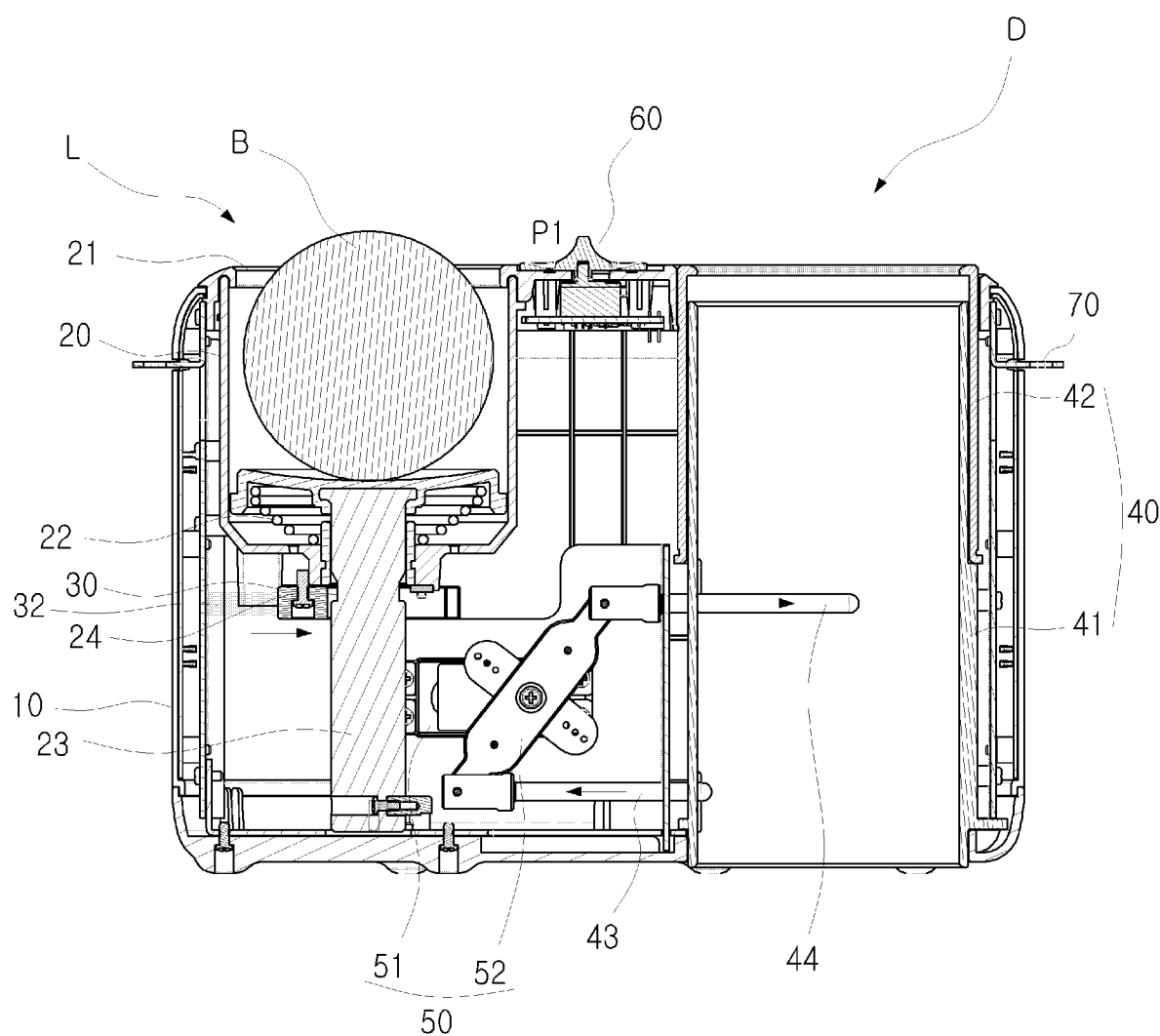
FIG. 5 is a diagram illustrating a state in which a ball is received in a launcher unit of the ball trainer with a launcher function and a dropper function according to the embodiment of the invention and a launcher spring is compressed.
Figure 6:
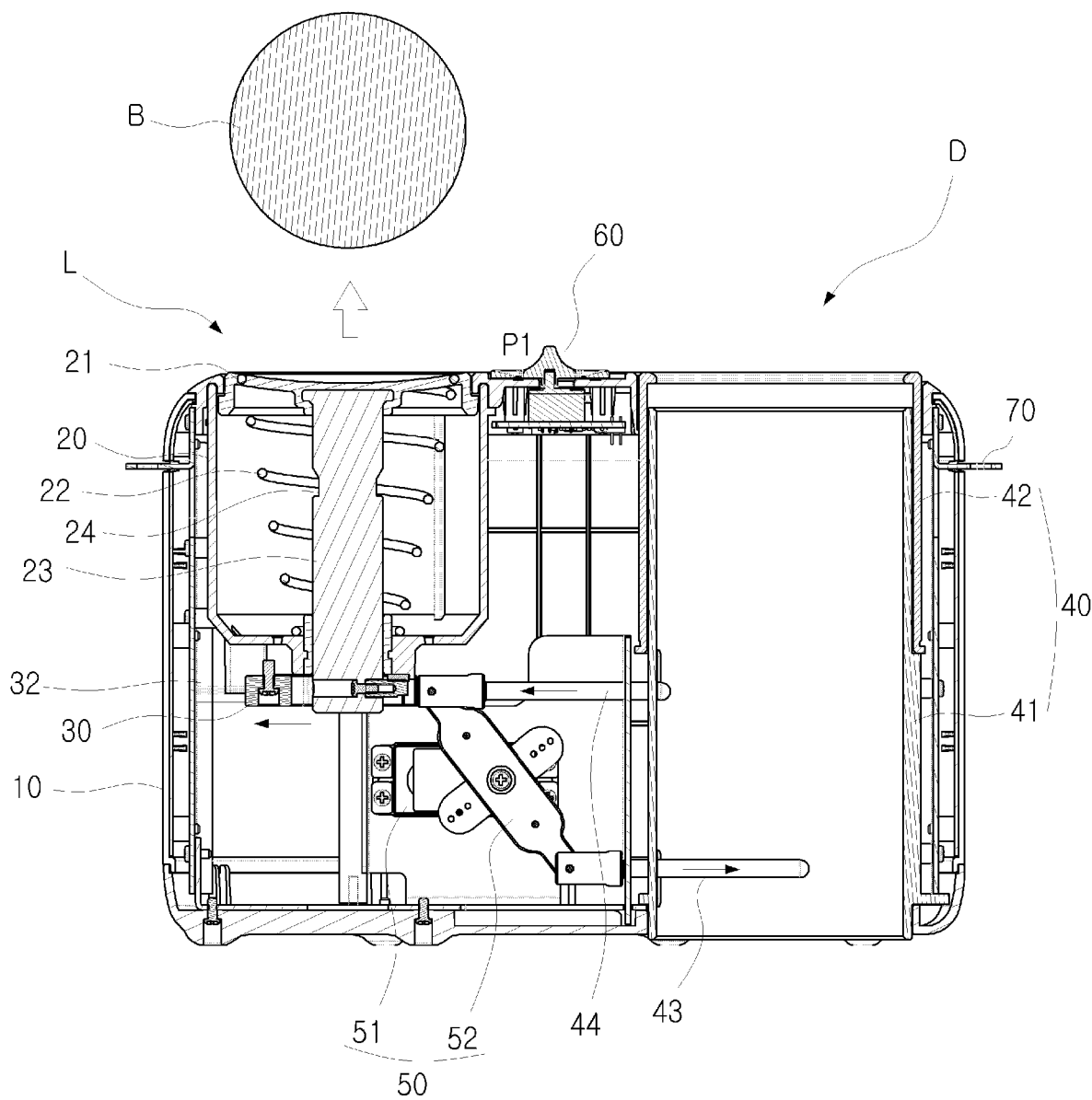
FIG. 6 is a diagram illustrating an operating state in which a ball is launched from the launcher unit of the ball trainer with a launcher function and a dropper function according to the embodiment of the invention.
Figure 7B:
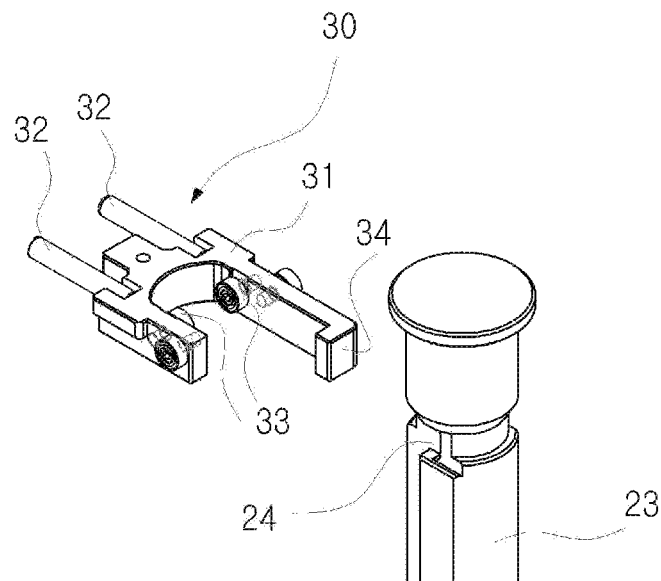
FIGS. 7A to 7C are diagrams illustrating details of a support rod and a locking portion.
Figure 7A:
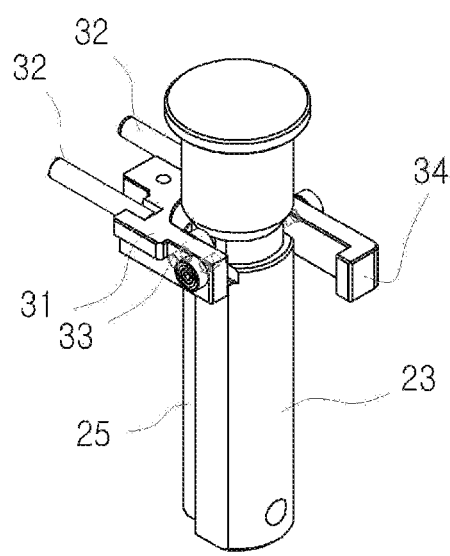
Figure 7C:
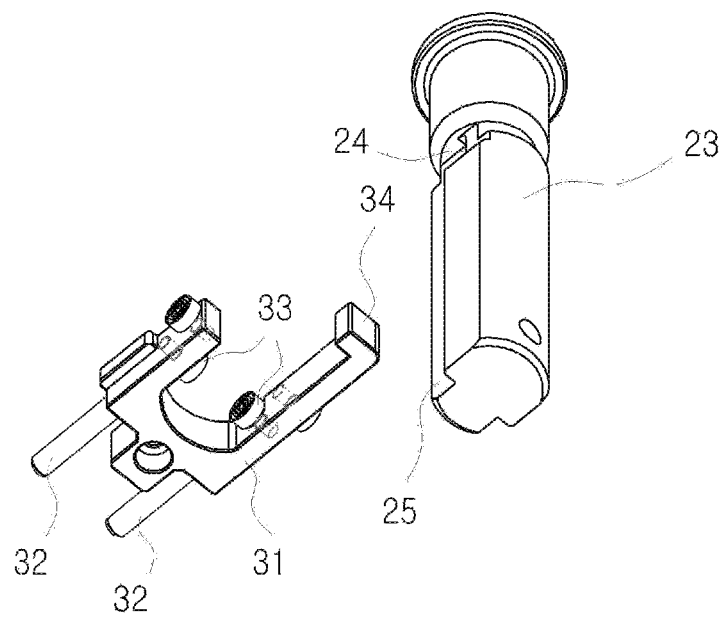

FIG. 5 is a diagram illustrating a state in which a ball is received in the launcher unit of the ball trainer with a launcher function and a dropper function according to the embodiment of the invention and the launcher spring is compressed. FIG. 6 is a diagram illustrating an operating state in which a ball is launched from the launcher unit of the ball trainer with a launcher function and a dropper function according to the embodiment of the invention. FIG. 7 is a diagram illustrating details of the support rod and the locking portion.

The operation of the launcher unit L will be described below with reference to FIGS. 5 to 7C.

When a ball B is placed on the receiving stand 21 and then the receiving stand 21 is pushed downward with a force applied thereto, the launcher spring 22 is elastically compressed. At this time, the locking portion 30 is not locked to the locking rod 23, and the launcher spring is compressed until the locking portion 30 is located at a position corresponding to the locking groove 24.

The locking portion 30 includes a locking body 31 of which one side is open, a locking spring 32 that is disposed on the other side of the locking body 31, locking protrusions 33 that are disposed to protrude from the inner side surfaces of the locking body 31, and a pressing force receiving portion 34 that is formed at one end of the locking body 31.

The locking portion 30 is located at a height corresponding to the intermediate locking rod 44. This is because the pressing force receiving portion 34 receives a pressing force from the intermediate locking rod 44.

The locking spring 32 pushes the locking body 31 toward the support rod 23 with an elastic force thereof.

The locking groove 24 is formed horizontally at a predetermined height on the surface of the support rod 23, and a guide groove 25 is formed in the length direction of the support rod 23. The locking groove 24 is formed to be recessed from the upper end of the guide groove 25 by a predetermined length to the inside of the support rod 23.

When the locking groove 24 reaches the position of the locking portion 30 while the support 23 moves downward by compression, the locking body 31, particularly, the locking protrusion 33, that is biased to the support rod 23 by the locking spring 32 is locked to the locking groove 24.

When the support rod 23 is locked by the locking portion 30, the receiving stand 21 maximally compresses the launcher spring 22 at the lowest position. Then, the ball B received on the receiving stand 21 can be located in the launcher holder 20. The pressing force receiving portion 34 protrudes from the support rod 23 toward the intermediate locking rod 44 by the locking spring 32.

When the ball trainer 1 serves as the launcher unit L, the slide switch 60 is located at the position P1, and the drive unit 50 is set to a state (a launch standby state) in which the locking rod 43 moves backward and the intermediate locking rod 44 moves forward with respect to the dropper unit D.

When a launching signal is input, the drive unit 50 operates to counterclockwise rotate the rotary support 51 into a state (a launching state) in which the locking rod 43 moves forward and the intermediate locking rod 44 moves backward with respect to the dropper unit D. In this case, an end of the intermediate locking rod 44 presses the protruding pressing force receiving portion 34 of the locking portion 30 by backward movement of the intermediate locking rod 44. When the locking protrusion 33 is separated from the locking groove 24 against the elastic force of the locking spring 32 by instantaneous push of the pressing force receiving portion 34, the support rod 23 and the receiving stand 21 are raised by the elastic force of the launcher spring 22 and a ball B placed on the receiving stand 21 is launched upward.

When the support rod 23 descends or ascends, the locking protrusion 33 can be located in the guide groove 25 such that the ascent or descent of the support rod 23 is not hindered.

Figure 8:
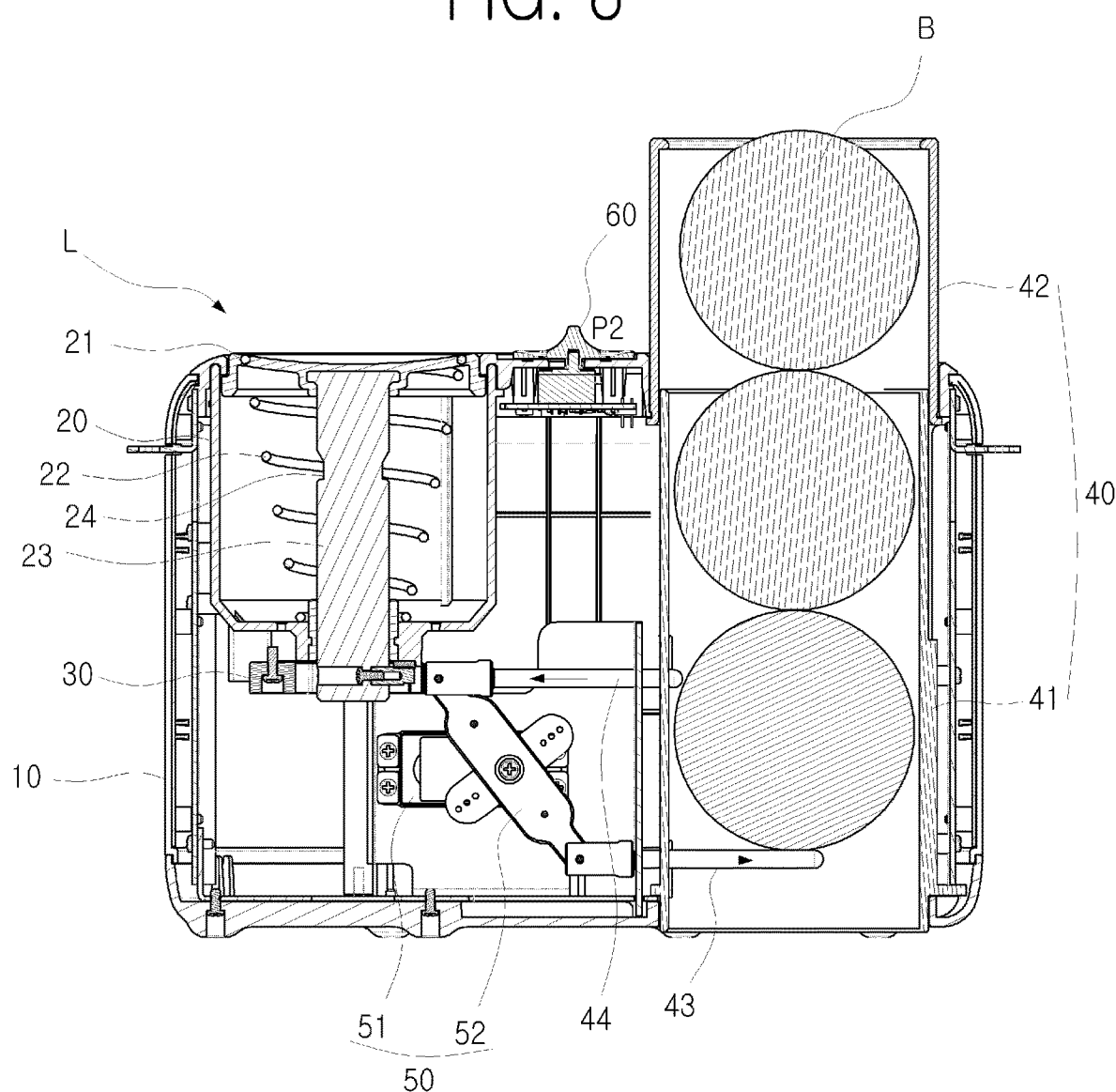
FIG. 8 is a diagram illustrating an operating state in which a receiving space of a dropper unit of the ball trainer with a launcher function and a dropper function according to the embodiment of the invention is adjusted.
Figure 9:
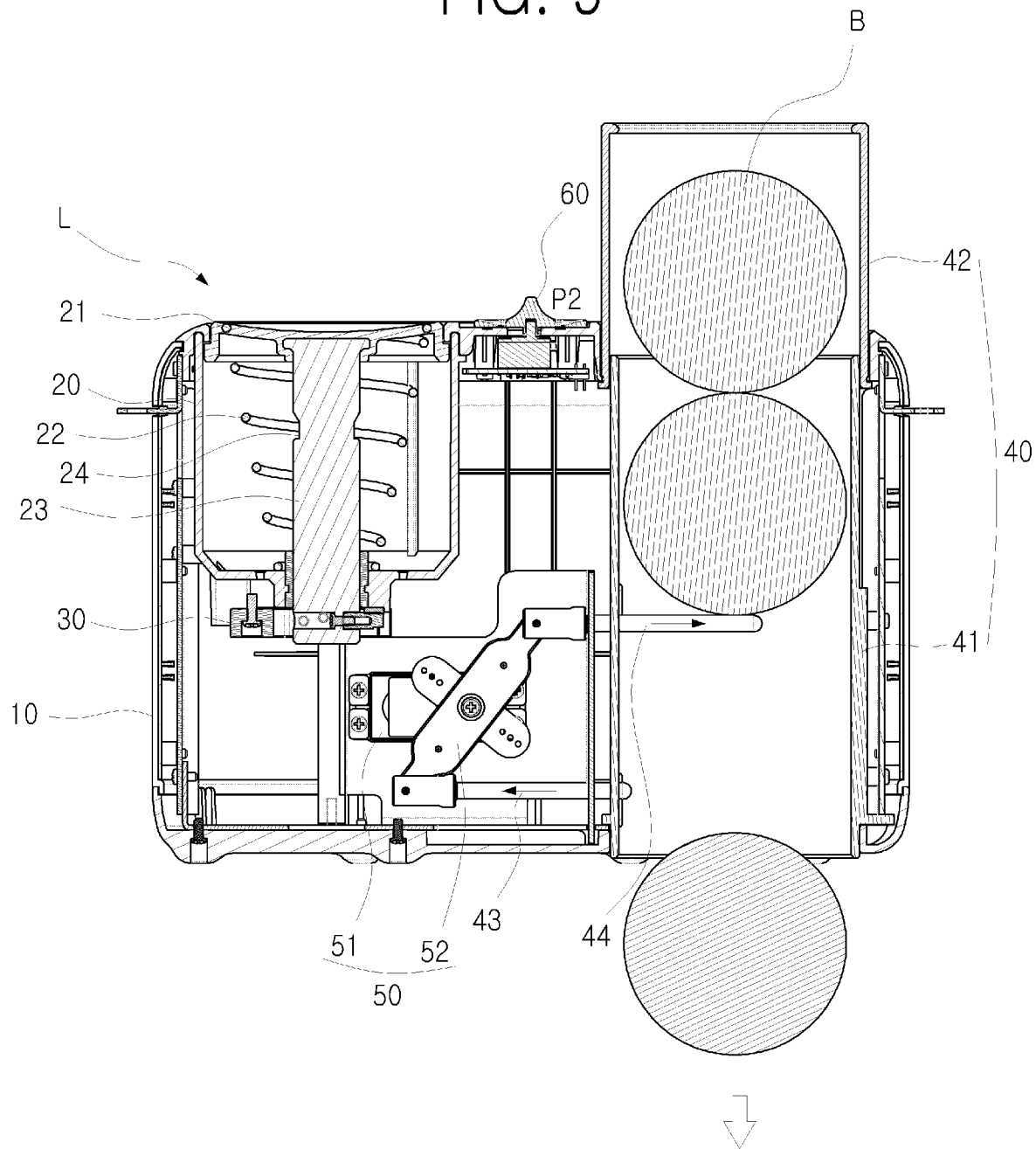
FIG. 9 is a diagram illustrating an operating state in which a ball is dropped from the dropper unit of the ball trainer with a launcher function and a dropper function according to the embodiment of the invention.

FIG. 8 is a diagram illustrating an operating state in which a receiving space of the dropper unit of the ball trainer with a launcher function and a dropper function according to the embodiment of the invention is adjusted. FIG. 9 is a diagram illustrating an operating state in which a ball is dropped from the dropper unit of the ball trainer with a launcher function and a dropper function according to the embodiment of the invention.

The operation of the dropper unit D will be described below with reference to FIGS. 8 and 9.

When a user carries the ball trainer, the extension holder 42 is located in the housing 10 to reduce the total volume as illustrated in FIG. 4. When the ball trainer is used as the dropper unit D, the extension holder 42 is exposed to the outside to increase the total height of the extension holder 40 and to increase the number of balls which are received therein. The number of balls is illustrated to increase from two to three in the drawing, but when the height of the extension holder 42 and the number of extension holders increase, it is possible to further increase the number of balls received in the dropper unit D.

When the ball trainer 1 serves as the dropper unit D, the slide switch 60 is located at the position P2 and the drive unit 50 is set to a state (a drop standby state) in which the locking rod 43 moves forward and the intermediate locking rod 44 moves backward with respect to the dropper unit D.

Two balls are basically received in the main holder 41 of the dropper unit D. When an operation signal is received from a remote controller, the drive unit 50 is driven via the communication module T and the control module C.

When the motor 51 is activated, the rotary support 52 rotates clockwise, the locking rod 43 below the launcher holder 20 moves backward, and the intermediate locking rod 44 moves forward (a drop state). In this case, a ball located at the lowermost is dropped via a discharge port, and a ball located at the second lowermost is supported by the intermediate locking rod 44 moving forward to prevent dropping thereof.

When a ball is dropped and then the rotary support 52 rotates counterclockwise by the motor 51, the locking rod 43 moves forward and the intermediate locking rod 44 moves backward to enter the drop standby state again. In this case, a ball located at the second lowermost moves downward and is finally supported by the locking rod 43 not to be dropped from the discharge port.

In this embodiment, by setting the basic state of the drive unit to be different when the ball trainer serves as the dropper unit and the launcher unit, unnecessary operations of the motor 51 and the rotary support 52 can be minimized and an animal sensitive to sound can be prevented from reacting with operation sound, not with drop or launch, thereby enhancing training quality.

Figure 11:
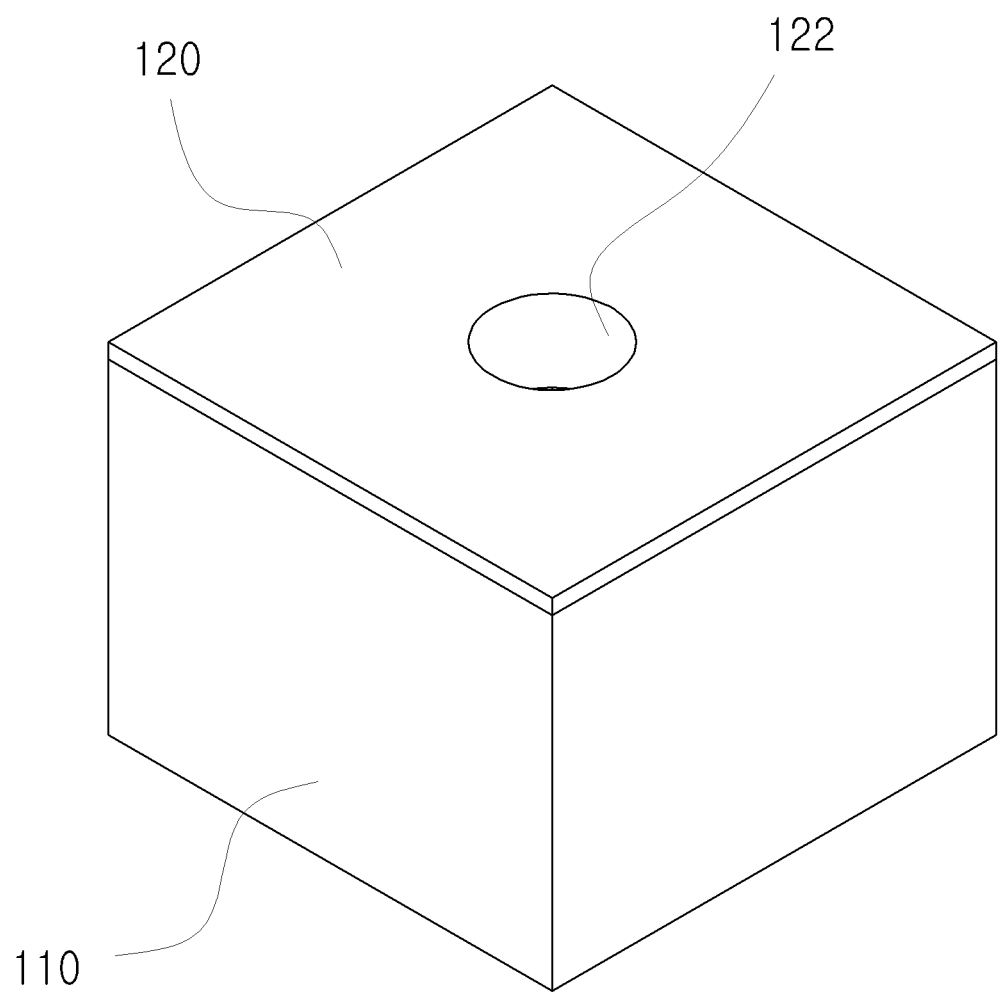
FIG. 11 is a perspective view of a training box that supports the ball trainer according to the embodiment of the invention.
Figure 12A:
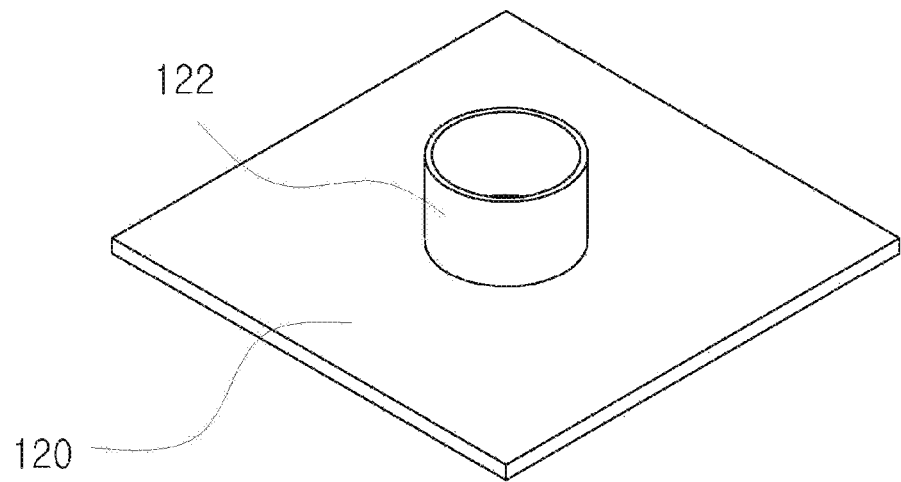
FIGS. 12A and 12B are diagrams illustrating a top lid and a box body of the training box illustrated in FIG. 11.
Figure 12B:
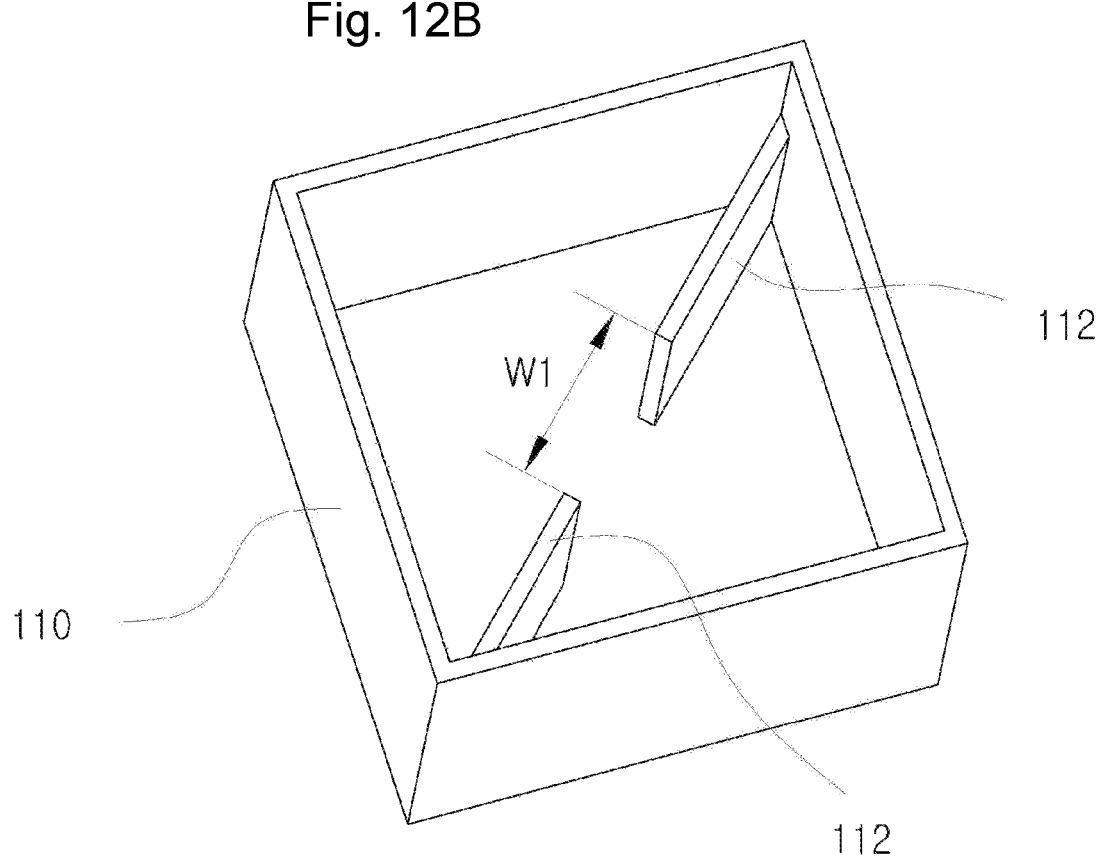
Figure 13:
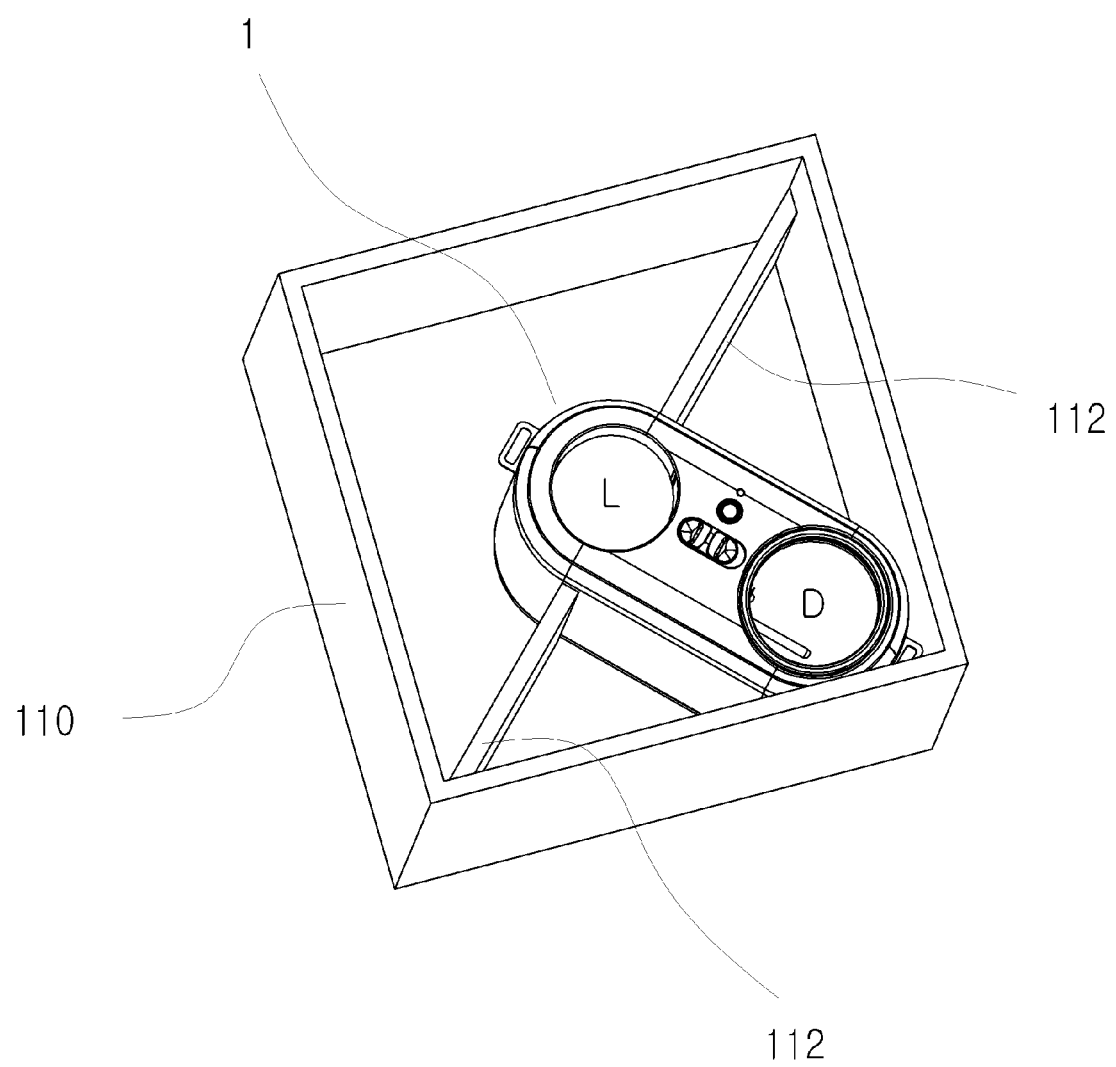
FIG. 13 is a diagram illustrating a state in which the ball trainer is mounted in the training box illustrated in FIG. 12.

FIG. 11 is a perspective view of a training box that supports the ball trainer according to the embodiment of the invention. FIG. 12 is diagrams illustrating a top lid and a box body of the training box illustrated in FIG. 11. FIG. 13 is a diagram illustrating a state in which the ball trainer is mounted in the training box illustrated in FIG. 12. The upper part of FIG. 12 illustrates a state in which the top lid is upside down.

The training box 100 is a box structure which has a rectangular parallelepiped shape and of which the inside is empty.

The training box 100 includes a boxy body 110 of which one surface is open and a lid 120 that covers the open surface of the box body 110.

A pair of vertical supports 112 that supports the ball trainer 1 is installed in the box body 110. The vertical supports 112 are installed in a diagonal direction of the box body 110. A gap W1 corresponding to the width of the ball trainer 1 is disposed between the vertical supports 112.

The ball trainer 1 can be inserted into the gap between the vertical supports 112 and can be fixed upright. Without using the above-mentioned foldable supports 90, the ball trainer 1 can be stably supported by the vertical supports 112 without falling.

The lid 120 has a rectangular plate shape, and a cylindrical guide 122 having an inner diameter corresponding to the diameter of a ball is formed to protrude at the center of the inner surface thereof. The protruding height of the cylindrical guide 122 can be set such that an end of the cylindrical guide 122 meets the top surface of the launcher L of the ball trainer 1 mounted in the box body 110 when the training box 100 has been assembled.

When the ball trainer 1 is mounted in the box body 110 as illustrated in FIG. 13, the cylindrical guide 122 meets the vertical top of the launcher L and a ball which is launched from the launcher unit L can be launched outward via the cylindrical guide 122 without being hindered.

The training box 100 can be placed on the ground. Alternatively, the training box 10 may be attached to a wall surface such that the lid 120 faces the front side.

With the training box 100 with a box shape according to this embodiment, it is possible to enable an animal to faithfully participate in training without paying attention to the ball trainer 1 itself. For example, by arranging a plurality of training boxes 100 in a line and randomly setting the training box from which a ball is launched, it is possible to enhance a training effect.

While the invention is described above with reference to the embodiments, it will be understood by those skilled in the art that the invention can be modified and changed in various forms without departing from the concept and scope of the invention described in the appended claims.

What is claimed is:

1. A ball trainer configured to perform both a ball launcher function and a ball dropper function, the ball trainer comprising:
   a dropper unit that is disposed in a housing and is formed in a holder shape including a storage space with a variable length in which two or more first balls are stored and configured to drop one of the two or more stored first balls downward;
   a launcher unit that is disposed in the housing and configured to receive, store, and launch a second ball;
   a control module that selectively controls the dropper unit to drop the one of the two or more first balls downward and the launcher unit to launch the second ball based on a remote signal; and
   a communication module that is connected to the control module for receiving the remote signal in a wireless or wired manner and transmitting the remote signal to the control module;
   a locking rod and an intermediate locking rod configured to move in and out of the storage space of the dropper unit in opposite directions so that when the locking rod is moved out of the storage space the one of the two or more stored first balls falls downward and the intermediate locking rod moves in the storage space to prevent the remaining of the two or more stored first balls from falling downward.

2. The ball trainer according to claim 1, wherein the dropper unit includes:
   a main holder that has a pipe shape which is vertically open; and
   an extension holder that has an inner diameter larger than an outer diameter of the main holder and overlaps to surround an outer circumferential surface of the main holder.

3. The ball trainer according to claim 2, wherein the extension holder is movable along the outer circumferential surface of the main holder, and wherein the extension holder protrudes from the housing such that at least one of the two or more first balls is received in the extension holder.

4. The ball trainer according to claim 2, wherein:
   the locking rod is disposed to be suspended below the one of the two or more first balls stored in the main holder and moves forward or backward to drop the one of the two or more first balls downward out of the ball trainer;
   the intermediate locking rod is disposed to be separated from the locking rod by a distance equal to a diameter of each of the one of the two or more first balls and moves oppositely to the locking rod; and
   a drive unit that activates the locking rod and the intermediate locking rod in response to the signal.

5. The ball trainer according to claim 4, wherein the drive unit includes:
   a motor; and
   a rotary support that rotates by the motor and has the locking rod and the intermediate locking rod connected to both ends thereof, and
   wherein the locking rod and the intermediate locking rod protrude alternately into the main holder with the rotation of the rotary support.

6. The ball trainer according to claim 4, wherein a state in which the locking rod moves forward and the intermediate locking rod moves backward is set as a drop standby state, and the drop standby state is switched to a drop state in which the locking rod moves backward and the intermediate locking rod moves forward by the drive unit.

7. The ball trainer according to claim 5, wherein the launcher unit includes:
   a launcher holder that is open upward and provides a space in which a ball is received;
   a receiving stand that moves along an inner side surface of the launcher holder and on which the second ball is received;
   a launcher spring that is disposed below the receiving stand and transmits an elastic force based on compression to the receiving stand between the receiving stand and the launcher holder;
   a support rod that is formed long below the receiving stand; and
   a locking portion that is formed to correspond to a locking groove formed on a side surface of the support rod and launches a ball by the elastic force of the launcher spring.

8. The ball trainer according to claim 7, wherein the locking portion includes:
   a locking body of which one side is open;
   a locking spring that is disposed on the other side of the locking body and biases the locking body to the support rod;
   a locking protrusion that is disposed to protrude from the inner side surface of the locking body; and
   a pressing force receiving portion that is formed at one end of the locking body, and
   wherein the locking portion is located at a height corresponding to the intermediate locking rod and switches the pressing force receiving portion from a locked state to an unlocked state receiving a pressing force from the other end of the intermediate locking rod.

9. The ball trainer according to claim 8, wherein a state in which the locking rod moves backward and the intermediate locking rod moves forward is set as a launch standby state, and the launch standby state is switched to a launch state in which the locking rod moves forward and the intermediate locking rod moves backward by the drive unit.

10. The ball trainer according to claim 7, wherein the launcher spring is a conical spring.

11. The ball trainer according to claim 1, further comprising a foldable support that is disposed on a bottom surface of the housing and is exposed to the outside at a time of operation of the launcher unit such that the ball trainer does not shake due to vibration of the launcher unit.

12. A training box comprising:
- a box body that has a box shape of which one surface is open and an inside of which is empty and has the ball trainer according to any one of claims 1 to 11 mounted therein; and
- a lid that covers the open surface of the box body,
- wherein a cylindrical guide having an inner diameter corresponding to a diameter of the ball is formed to protrude at a center of an inner surface of the lid.

13. The training box according to claim 12, wherein a pair of vertical supports is diagonally separated from each other in the box body, and
- wherein the ball trainer is inserted between the vertical supports and the launcher unit is disposed at a center of the box body to meet an end of the cylindrical guide.

* * * * *